United States Patent
Isomura et al.

(10) Patent No.: US 7,689,074 B2
(45) Date of Patent: Mar. 30, 2010

(54) OPTICAL RECEPTION APPARATUS COMPATIBLE WITH DQPSK POLARIZATION MULTIPLEXING FORMAT

(75) Inventors: Akihiko Isomura, Machida (JP); Jens Rasmussen, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 41 days.

(21) Appl. No.: 12/232,607

(22) Filed: Sep. 19, 2008

(65) Prior Publication Data

US 2009/0196610 A1 Aug. 6, 2009

(30) Foreign Application Priority Data

Jan. 31, 2008 (JP) ............... 2008-021996

(51) Int. Cl.
*G02B 6/28* (2006.01)
(52) U.S. Cl. ............... 385/24; 385/15; 385/31
(58) Field of Classification Search ............ 385/15, 385/24, 31
See application file for complete search history.

(56) References Cited

U.S. PATENT DOCUMENTS 7,539,217 B2 * 5/2009 Iwami .................. 370/480
7,630,650 B2 * 12/2009 Hoshida et al. .......... 398/183
2007/0177151 A1 8/2007 Isomura et al.

FOREIGN PATENT DOCUMENTS

| JP | 2007201939 | 8/2007 |
|----|------------|--------|
| JP | 2007020138 | 1/2008 |
| WO | WO 2007/007864 | 1/2007 |

* cited by examiner

*Primary Examiner*—Jennifer Doan
(74) *Attorney, Agent, or Firm*—Staas & Halsey LLP

(57) ABSTRACT

In the optical reception apparatus, a DQPSK polarization multiplexed signal light (S) input thereto is split into horizontally/vertically polarized signal lights ($S_H$, $S_V$) by a polarization beam splitter (3), and the signal lights ($S_H$, $S_V$) each is branched into two by each of optical couplers ($4_H$, $4_V$). Then, one branched lights ($S_{H1}$, $S_{V1}$) by each of the optical couplers ($4_H$, $4_V$) are supplied to a delay interferometer ($5_I$) on the I branch via optical circulators ($10_{I1}$, $10_{I2}$) to be propagated in bidirectional, and the other branched lights ($S_{HQ}$, $S_{VQ}$) by each of the optical couplers ($4_H$, $4_V$) are supplied to a delay interferometer ($5_Q$) on the Q branch side via optical circulators ($10_{Q1}$, $10_{Q2}$) to be propagated in bidirectional, so that a set of delay interferometers ($5_I$, $5_Q$) is commonly used for horizontally polarized waves and vertically polarized waves.

12 Claims, 6 Drawing Sheets

RELATED ART

OPTICAL RECEPTION APPARATUS COMPATIBLE WITH DQPSK POLARIZATION MULTIPLEXING FORMAT

CROSS-REFERENCE TO RELATED APPLICATION

This application is based upon and claims the benefit of priority of the prior Japanese Patent Application No. 2008-021996, filed on Jan. 31, 2008, the entire contents of which are incorporated herein by reference.

FIELD

The present invention relates to an optical reception apparatus for an optical communication system which transmits a differential quadrature phase shift keying (DQPSK) modulated signal light using a polarization multiplexing format.

BACKGROUND

In recent years, various types of transmission formats have been reviewed for the standardization of Ethernet at 100 Gbps (gigabits/second). An attractive, spectrally efficient modulation format is DQPSK. And utilizing the two polarization modes supported by an optical fiber (polarization multiplexing) allows to further double the spectral efficiency. The DQPSK modulated signal lights are signals for transferring information by phase changes (four values of 0, $\pi/2$, $\pi$ and $3\pi/2$) between two symbols adjacent to each other. A signal light (to be referred to as a DQPSK polarization multiplexed signal light hereunder) which is obtained by polarization multiplexing a set of DQPSK modulated signal lights of which polarization states are different from each other, is capable of decreasing a baud rate, and also, has favorable polarization mode dispersion (PMD) tolerance and favorable chromatic dispersion resistance.

FIG. 6 shows a typical configuration example of an optical reception apparatus compatible with a DQPSK polarization multiplexing format. In this optical reception apparatus, a DQPSK polarization multiplexed signal light transmitted over a transmission path 101 of an optical communication system is input to a polarization beam splitter 103 via a polarization controller (PC) 102, to be split into a horizontally polarized signal light $S_H$ and a vertically polarized signal light $S_V$. The horizontally polarized signal light $S_H$ is branched into two by an optical coupler (CPL) $104_H$, and the vertically polarized signal light $S_V$ is branched into two by an optical coupler (CPL) $104_V$. The branched lights $S_{HI}$ and $S_{HQ}$ of the optical coupler $104_H$ are supplied to a substrate $105_H$, and the branched lights $S_{VI}$ and $S_{VQ}$ of the optical coupler $104_V$ are supplied to a substrate $105_V$. On each of the substrates $105_H$ and $105_V$, there is formed a set of delay interferometers corresponding to I branch and Q branch, and each of the delay interferometers is provided with an optical delay element with a delay equivalent to the duration of one symbol in the optical communication system. Further, an optical phase difference between the arms of each delay interferometer is set at "$\pi/4$" in I branch and at "$-\pi/4$" in Q branch. Two output terminals of each delay interferometer on the substrate $105_H$ are connected to balanced optical detectors (O/E) $106_{HI}$ and $106_{HQ}$, and also, two output terminals of each delay interferometer on the substrate $105_V$ are connected to balanced optical detector (O/E) $106_{VI}$ and $106_{VQ}$. Then, signals photoelectrically converted in the respective balanced optical detectors $106_{HI}$, $106_{HQ}$, $106_{VI}$ and $106_{VQ}$ are processed in a reception circuit 107, so that reception data $D_H$ obtained by demodulating the horizontally polarized DQPSK modulated signal light and reception data $D_V$ obtained by demodulating the vertically polarized DQPSK modulated signal light are regenerated.

Further, in the above optical reception apparatus, it is very important that the optical phase difference between the arms of each delay interferometer is exactly set at "$\pi/4$" on the substrates $105_H$ and "$-\pi/4$" on the substrate $105_V$. If a deviation occurs in the optical phase difference, the signal can degraded beyond an allowable threshold. Therefore, the phase error is monitored by each of control circuits $108_H$ and $108_V$ based on output signals from the reception circuit 107, to perform a feedback control for optimizing the temperature and the like of each delay interferometer so that an optical phase is held at a target value (refer to Japanese Unexamined Patent Publications No. 2007-20138 and No. 2007-201939).

However, the optical reception apparatus compatible with the DQPSK polarization multiplexing format as shown in FIG. 6 problematically grows in size. Namely, the optical reception apparatus compatible with the DQPSK polarization multiplexing format needs a configuration twice as large as a DQPSK modulated signal light reception apparatus which does not perform the polarization multiplexing. In particular, each substrate formed with a set of delay interferometers is in a large size, since each delay interferometer performs the optical demultiplexing and the optical multiplexing. Accordingly, it is a problem how an implementing space for each delay interferometer is ensured within the apparatus. Further, since two substrates for delay interferometers are needed, the electric power, which is used by a device for regulating the temperature of each delay interferometer (for example, a heater, a Peltier unit or the like) when the optical phase difference is feedback controlled, becomes twice the electric power used for the case where the polarization multiplexing is not performed. Therefore, there is also a problem of an increase of power consumption. Furthermore, since the temperature of the delay interferometer is controlled by an analog circuit, characteristic variations in circuit parts have large effects, and accordingly, the precise circuit designing and the precise implementation are necessary. However, since the delay interferometer being a control object becomes twice, the characteristic variations in the parts used for the circuit corresponding to each delay interferometer need to become smaller, and accordingly, there is a problem in that the apparatus cost is increased.

SUMMARY

The present invention has been accomplished in view of the above problems and has the objective to provide an optical reception apparatus for a DQPSK polarization multiplexing format, of low cost and low power consumption, with a simple configuration capable of being miniaturized.

In order to achieve the above object, one aspect of the optical reception apparatus for receiving to process a DQPSK polarization multiplexed signal light obtained by polarization multiplexing a set of DQPSK modulated signal lights of which polarization states are different from each other, comprises: a polarization splitting section; first and second branching sections; first and second branches; first and second delay interfering sections; a signal light input/output section; first to fourth photoelectric converting sections; a reception processing section; and a control section. The polarization splitting section splits the DQPSK polarization multiplexed signal light input thereto into a horizontally polarized DQPSK modulated signal light and a vertically polarized DQPSK modulated signal light. The first branching section branches the horizontally polarized DQPSK modulated signal light split by the polarization splitting section into two, to generate a first horizontally polarized signal light and a second horizontally polarized signal light. The second branching section branches the vertically polarized DQPSK modulated signal light split by the polarized splitting section into two, to generate a first vertically polarized signal light and a second vertically polarized signal light. The first horizontally polarized signal light and the first vertically polarized signal light are propagated through the first branch, whereas the second horizontally polarized signal light and the second vertically polarized signal light are propagated through the second branch. The first delay interfering section is arranged on the first branch, and the second delay interfering section is arranged on the second branch. The signal light input/output section supplies to the first delay interfering section the first horizontally polarized signal light and the first vertically polarized signal light so that propagation directions thereof are opposite to each other, and supplies to the second delay interfering section the second horizontally polarized signal light and the second vertically polarized signal light so that propagation directions thereof are opposite to each other; and also, extracts the first horizontally polarized signal light and the first vertically polarized signal light which have been propagated through the first delay interfering section, and extracts the second horizontally polarized signal light and the second vertically polarized signal light which have been propagated through the second delay interfering section. The first to fourth photoelectric converting sections receive, respectively, the first horizontally polarized signal light, the first vertically polarized signal light, the second horizontally polarized signal light and the second vertically polarized signal light, which have been extracted by the signal light input/output section, to convert them into electric signals. The reception processing section processes the electric signals output from the first to fourth photoelectric converting sections, to regenerate reception data obtained by demodulating the horizontally polarized DQPSK modulated signal light and reception data obtained by demodulating the vertically polarized DQPSK modulated signal light. The control section feedback controls the first and second delay interfering sections based on the process result in the reception processing section.

In the optical transmission apparatus of the above configuration, the signal light input/output section supplies to the first delay interfering section the first horizontally polarized signal light and the first vertically polarized signal light in bidirectional, and also, supplies to the second delay interfering section the second horizontally polarized signal light and the second vertically polarized signal light in bidirectional, so that a set of delay interfering sections is commonly used for horizontal polarized waves and vertical polarized waves.

Another aspect of the optical reception apparatus for receiving to process a DQPSK polarization multiplexed signal light obtained by polarization multiplexing a set of DQPSK modulated signal lights of which polarization states are different from each other, comprises: a polarization controller; a branching section; first and second delay interfering sections; first to fourth polarization beam splitters; first to fourth photoelectric converting sections; a reception processing section; and a control section. The polarization controller controls a polarization state of the DQPSK polarization multiplexed signal light input thereto. The branching section branches the DQPSK polarization multiplexed signal light output from the polarization controller into two, to generate a first DQPSK polarization multiplexed signal light and a second DQPSK polarization multiplexed signal light. The first delay interfering section is supplied with the first DQPSK polarization multiplexed signal light at an input port thereof, and the second delay interfering section is supplied with the second DQPSK polarization multiplexed signal light at an input port thereof. The first polarization beam splitter is connected to one of two output ports of the first delay interfering section. The second polarization beam splitter which is connected to the other of the two output ports of the first delay interfering section, has a polarization axis in the same direction as that of the first polarization beam splitter. The third polarization beam splitter which is connected to one of two output ports of the second delay interfering section, has a polarization axis in the same direction as that of the first polarization beam splitter. The fourth polarization beam splitter which is connected to the other of the two output ports of the second delay interfering section, has a polarization axis in the same direction as that of the first polarization beam splitter. The first photoelectric converting section receives horizontally polarized signal lights output from the first and second polarization beam splitters to convert them into electric signals. The second photoelectric converting section receives horizontally polarized signal lights output from the third and fourth polarization beam splitters to convert them into electric signals. The third photoelectric converting section receives vertically polarized signal lights output from the first and second polarization beam splitters to convert them into electric signals. The fourth photoelectric converting section receives vertically polarized signal lights output from the third and fourth polarization beam splitters to convert them into electric signals. The reception processing section processes the electric signals output from the first to fourth photoelectric converting sections, to regenerate reception data obtained by demodulating the horizontally polarized DQPSK modulated signal light and reception data obtained by demodulating the vertically polarized DQPSK modulated signal light. The control section feedback controls the first and second delay interfering section and the polarization controller, based on the process result in the reception processing section.

In the optical reception apparatus of the above configuration, the DQPSK polarization multiplexed signal light is supplied to the first and second delay interfering sections before being polarization split, and the lights propagated through the first and second delay interfering sections are split into the horizontally polarized signal lights and the vertically polarized signal lights by the first to fourth polarization beam splitters. Consequently, also in this configuration, a set of delay interfering sections are commonly used for the horizontally polarized waves and the vertical polarized waves.

According to the present reception apparatus as described above, it becomes possible to receive to process the DQPSK polarization multiplexed signal light by the use of the delay interfering section with the simple configuration basically similar to that of a delay interfering section in a DQPSK modulated signal light reception apparatus which does not perform the polarization multiplexing. Further, a set of delay interfering sections are commonly used for the horizontally polarization waves and the vertically polarized waves, so that the configuration for feedback controlling an optical phase difference between the delay interfering sections can be simplified. Consequently, it is possible to reduce the electric power necessary for controlling the delay interfering sections and effects due to characteristic variations in circuit parts. Thus, it becomes possible to provide the optical reception apparatus of low cost and low power consumption, which is compatible with the DQPSK polarization multiplexing format.

Other objectives, features and advantages of the present invention will become apparent from the following explanation of the embodiments, in conjunction with the appended drawings.

DESCRIPTION OF EMBODIMENTS

Figure 1:
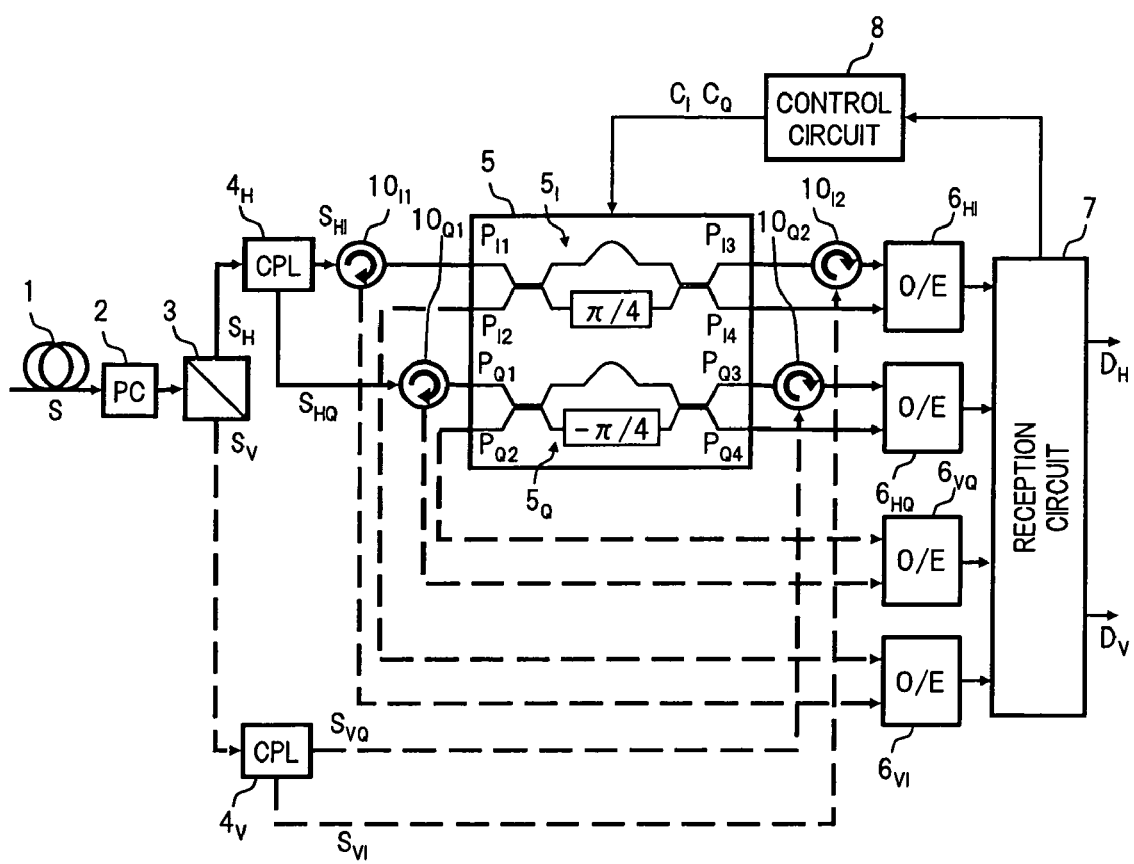
FIG. 1 is a block diagram showing a first embodiment of an optical reception apparatus compatible with a DQPSK polarization multiplexing format.

There will be described embodiments for implementing the present invention, with reference to the accompanying drawings. The same reference numerals denote the same or equivalent parts in all drawings.

FIG. 1 is a block diagram showing a first embodiment of an optical reception apparatus compatible with a DQPSK polarization multiplexing format, according to the present invention.

In FIG. 1, the optical transmission apparatus in the present embodiment comprises, for example: a polarization controller (PC) 2 connected to a reception end of a transmission path 1; a polarization beam splitter 3 serving as a polarization splitting section, connected to the polarization controller 2; optical couplers (CPL) $4_H$ and $4_V$ serving as first and second branching sections, which are input with a horizontally polarized signal light $S_H$ and a vertically polarized signal light $S_V$ output from the polarization beam splitter 3; a substrate 5 on which is formed a set of delay interferometers $5_I$ and $5_Q$ serving as first and second delay interfering sections; four optical circulators $10_{I1}$, $10_{Q1}$, $10_{I2}$ and $10_{Q2}$ serving as signal light input/output sections, which supply to the delay interferometers $5_I$ and $5_Q$ the lights branched by the optical couplers $4_H$ and $4_V$, and also, extract the lights passed through the delay interferometers $5_I$ and $5_Q$; balanced optical detectors (O/E) $6_{HI}$, $6_{HQ}$, $6_{VQ}$ and $6_{VI}$ serving as first to fourth photoelectric converting sections, which are input with the lights output from respective ports of the delay interferometers $5_I$ and $5_Q$ directly or via the optical circulators $10_{I1}$ to $10_{Q2}$; a reception circuit 7 serving as a reception processing section, which is input with output signals from the balanced optical detector $6_{HI}$ to $6_{VI}$ to regenerate reception data $D_H$ obtained by demodulating a horizontally polarized DQPSK modulated signal light and reception data $D_V$ obtained by demodulating a vertically polarized DQPSK modulated signal light; and a control circuit 8 serving as a control section, which monitors an optical phase difference based on an output signal from the reception circuit 7 to feedback control the delay interferometers $5_I$ and $5_Q$.

To be specific, the polarization controller 2 controls the polarization of a DQPSK polarization multiplexed signal light S so that the DQPSK polarization multiplexed signal light S transmitted over the transmission path 1 is input to the polarization beam splitter 3 in a desired polarization state. The polarization beam splitter 3 polarization splits the output light S from the polarization controller 2 into a horizontally polarized DQPSK modulated signal light $S_H$ and a vertically polarized DQPSK modulated signal light $S_V$. The optical coupler $4_H$ branches the horizontally polarized DQPSK modulated signal light $S_H$ output from the polarization beam splitter 3 into two, and sends one branched light $S_{HI}$ (a first horizontally polarized signal light) to the optical circulator $10_{I1}$, while sending the other branched light $S_{HQ}$ (a second horizontally polarized signal light) to the optical circulator $10_{Q1}$. The optical coupler $4_V$ branches the vertically polarized DQPSK modulated signal light $S_V$ output from the polarization beam splitter 3 into two, and sends one branched light $S_{VI}$ (a first vertically polarized signal light) to the optical circulator $10_{I2}$, while sending the other branched light $S_{VQ}$ (a second vertically polarized signal light) to the optical circulator $10_{Q2}$.

The delay interferometers $5_I$ and $5_Q$ which are formed on the substrate 5, each is configured using a Mach-Zehnder optical waveguide, and on one of arms (an upper side arm in FIG. 1) thereof, an optical delay element is disposed. A delay time is one symbolic time in a DQPSK modulated signal light. In the DQPSK modulated signal light, one symbolic time is equivalent to twice the inverse number of a bit rate of data. On the other arm (a lower side arm in FIG. 1) of each of the delay interferometers $5_I$ and $5_Q$, a phase-shifting element is disposed. A phase amount (phase-shifting amount) of the phase-shifting element disposed in the delay interferometer $5_I$ is "$\pi/4$". A phase amount of the phase-shifting element disposed in the delay interferometer $5_Q$ is "$-\pi/4$". These phase-shifting elements are control objects by the control circuit 8.

In the following description, a path of the light propagated through the delay interferometer $5_I$ is referred to as an I branch, whereas a path of the light propagated through the delay interferometer $5_Q$ is referred to as a Q branch. Further, four ports of the delay interferometer $5_I$ are a first port $P_{I1}$ positioned on an upper side on a left end face of the substrate 5, a second port $P_{I2}$ positioned on a lower side on the left end face thereof, a third port $P_{I3}$ positioned on an upper side on a right end face thereof and a fourth port $P_{I4}$ positioned on a lower side of the right end face thereof. Similarly to these, first to fourth ports of the delay interferometer $5_Q$ are $P_{Q1}$ to $P_{Q4}$.

The optical circulators $10_{I1}$, $10_{Q1}$, $10_{I2}$ and $10_{Q2}$ each comprises three connecting terminals, and has characteristics in that a light input to a first connecting terminal is output from a second connecting terminal, and a light input to the second connecting terminal is output from a third connecting terminal, while blocking a light traveling in a direction opposite to these light. In the optical circulator $10_{I1}$, the first connecting terminal is connected to one of branching ports of the optical coupler $4_H$, the second connecting terminal is connected to the first port $P_{I1}$ of the delay interferometer $5_I$, and the third connecting terminal is connected to an input port of the balanced optical detector $6_{VI}$. In the optical circulator $10_{Q1}$, the first connecting terminal is connected to the other branching port of the optical coupler $4_H$, the second connecting terminal is connected to the first port $P_{Q1}$ of the delay interferometer $5_Q$, and the third connecting terminal is connected to an input port of the balanced optical detector $6_{VQ}$. In the optical circulator $10_{I2}$, the first connecting terminal is connected to one of branching ports of the optical coupler $4_V$, the second connecting terminal is connected to the third port $P_{I3}$ of the delay interferometer $5_I$, and the third connecting terminal is connected to an input port of the balanced optical detector $6_{HI}$. In the optical circulator $10_{Q2}$, the first connecting terminal is connected to the other branching port of the optical coupler $4_V$, the second connecting terminal is connected to the third port $P_{Q3}$ of the delay interferometer $5_Q$, and the third connecting terminal is connected to an input port of the balanced optical detector $6_{HQ}$.

The balanced optical detectors $6_{HI}$, $6_{HQ}$, $6_{VQ}$ and $6_{VI}$ each comprises a pair of photodiodes, and receives an output light from the corresponding delay interferometer to perform a differential photoelectric conversion detection. A current signal output from each balanced optical detector is supplied to the reception circuit 7.

Figure 2:
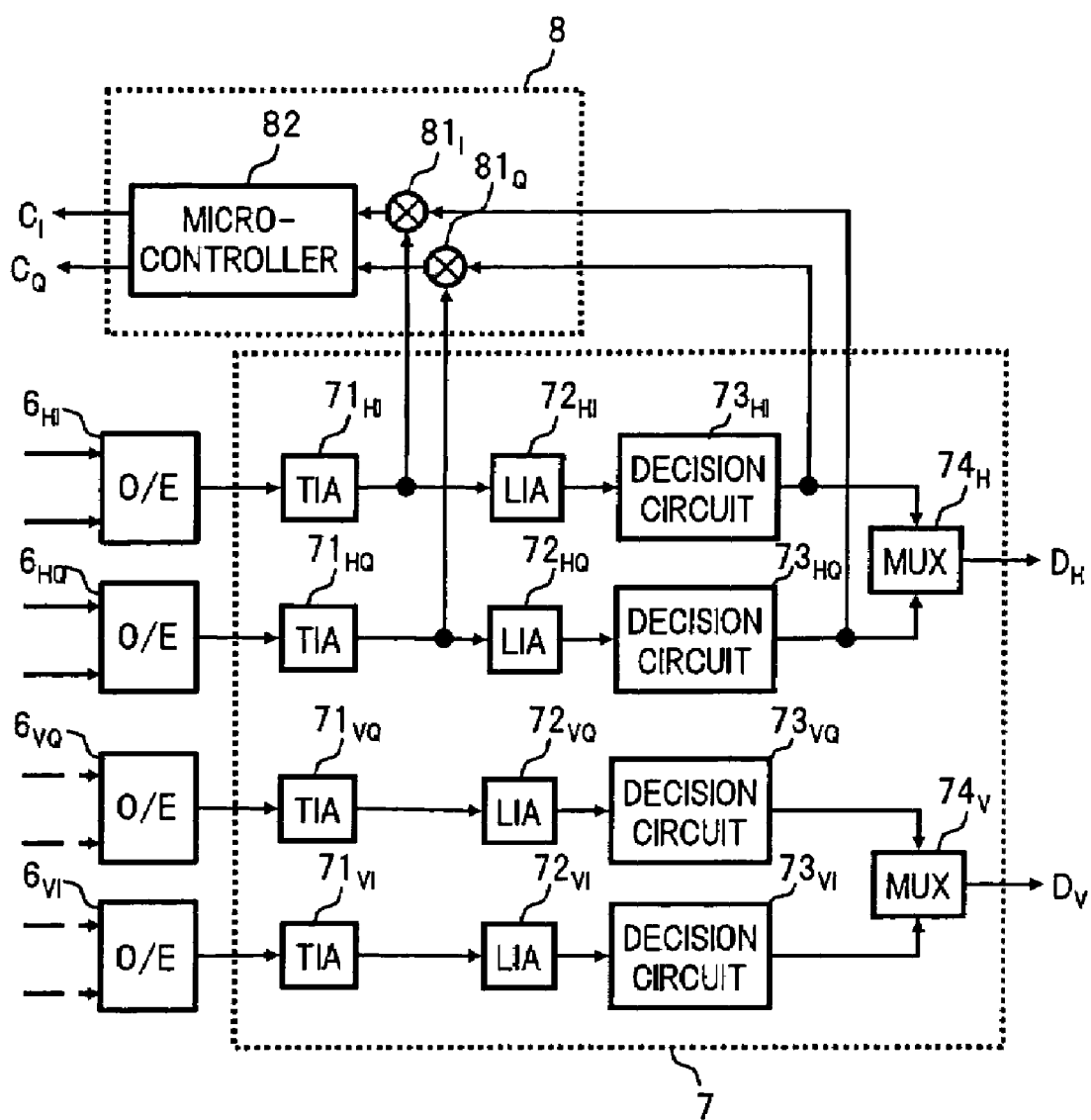
FIG. 2 is a diagram showing a specific configuration example of a reception circuit and a control circuit in the first embodiment.

As shown in a specific circuit diagram of FIG. 2 for example, the reception circuit 7 comprises: transimpedance amplifiers (TIA) $71_{HI}$, $71_{HQ}$, $71_{VQ}$ and $71_{VI}$; limiter amplifiers (LIA) $72_{HI}$, $72_{HQ}$, $72_{VQ}$ and $72_{VI}$; and decision circuits $73_{HI}$, $73_{HQ}$, $73_{VQ}$ and $73_{VI}$, which respectively correspond to the balanced optical detectors $6_{HI}$, $6_{HQ}$, $6_{VQ}$ and $6_{VI}$, and further, comprises: a multiplexer $74_H$ which multiplexes output signals of the decision circuits $73_{HI}$ and $73_{HQ}$ on the side corresponding to horizontally polarized waves; and a multiplexer $74_V$ which multiplexes output signals of the decision circuits $73_{VQ}$ and $73_{VI}$ on the side corresponding to vertically polarized waves.

The TIAs $71_{HI}$ to $71_{VI}$ respectively convert the current signals output from the balanced optical detectors $6_{HI}$ to $6_{VI}$ into voltage signals. Output signals of the TIAs $71_{HI}$ to $71_{VI}$ are respectively sent to the decision circuits $73_{HI}$ to $73_{VI}$ via the LIAs $72_{HI}$ to $72_{VI}$. Further, herein, for example, the output signals of the TIAs $71_{HI}$ and $71_{HQ}$ on the side corresponding to the horizontally polarized waves are also sent to mixers $81_I$ and $81_Q$ (to be described later) of the control circuit 8. The decision circuits $73_{HI}$ to $73_{VI}$ respectively utilize clocks regenerated from reception signals, to perform the logical judgment of the output signals of the LIAs $72_{HI}$ to $72_{VI}$. The output signals of the decision circuits $73_{HI}$ and $73_{HQ}$ are sent to the multiplexer $74_H$ and also sent to the mixers $81_Q$ and $81_I$ of the control circuit 8. The multiplexer $74_H$ multiplexes the output signals of the decision circuits $73_{HI}$ and $73_{HQ}$, to output the reception data $D_H$ obtained by demodulating the horizontally polarized DQPSK modulated signal light $S_H$. Further, the output signals of the decision circuits $73_{VQ}$ and $73_{VI}$ are sent to the multiplexer $74_V$. The multiplexer $74_V$ multiplexes the output signals of the decision circuits $73_{VQ}$ and $73_{VI}$, to output the reception data $D_V$ obtained by demodulating the vertically polarized DQPSK modulated signal light $S_V$.

The control circuit 8, as shown in FIG. 2 for example, comprises two mixers $81_I$ and $81_Q$, and a microcontroller 82. The mixer $81_I$ multiplies the output signal of TIA $71_{HI}$ by the output signal of the decision circuit $73_{HQ}$ to output the multiplication to the microcontroller 82. Further, the mixer $81_Q$ multiplies the output signal of TIA $71_{HQ}$ by the output signal of the decision circuit $73_{HI}$ to output the multiplication to the microcontroller 82. At this time, the voltage signals input to or output from the mixers $81_I$ and $81_Q$ are averaged (high frequency components thereof are eliminated by low-pass filters or the like (not shown in the figure)). The microcontroller 82 executes a predetermined operation process on the output signal from the mixer $81_I$, to generate a control signal $C_I$ for optimizing the optical phase difference (the phase-shifting amount) in the delay interferometer $5_I$ on the I branch, and also, executes a predetermined operation process on the output signal from the mixer $81_Q$, to generate a control signal $C_Q$ for optimizing the optical phase difference (the phase-shifting amount) in the delay interferometer $5_Q$ on the Q branch.

Herein, the control signals $C_I$ and $C_Q$ corresponding to the I branch and the Q branch are generated by a single microcontroller 82. However, microcontrollers individually corresponding to the respective branches may be disposed. In accordance with the control signals $C_I$ and $C_Q$, for example, temperature regulating devices (for example, a heater, a Peltier unit or the like, not shown in the figure) which are disposed on the substrate 5 corresponding to the delay interferometers $5_I$ and $5_Q$ are controlled, so that the phase-shifting amounts of the phase-shifting elements of the delay interferometers $5_I$ and $5_Q$ are regulated.

Next, there will be described an operation of the first embodiment.

In the optical reception apparatus of the above configuration, the DQPSK polarization multiplexed signal light S transmitted over the transmission path 1 is input to the polarization beam splitter 3 via the polarization controller 2, to be polarization split. The horizontally polarized DQPSK modulated signal light $S_H$ output from the polarization beam splitter 3 is branched into two at a power ratio of 1:1 in the optical coupler $4_H$, to thereby be the signal light $S_{HI}$ to be sent to the I branch side and the signal light $S_{HQ}$ to be sent to the Q branch side. Similarly, the vertically polarized DQPSK modulated signal light $S_V$ output from the polarization beam splitter 3 is branched into two at a power ratio of 1:1 in the optical coupler $4_V$, to thereby be the signal light $S_{VI}$ to be sent to the I branch side and the signal light $S_{VQ}$ to be sent to the Q branch side.

The signal light $S_{HI}$ on the I branch, which has been branched by the optical coupler $4_H$, passes through the optical circulator $10_{I1}$ to be input to the first port $P_{I1}$ of the delay interferometer $5_I$, and is propagated through the delay interferometer $5_I$ from the left hand to the right hand in FIG. 1, so that lights given to be interfered with the delay of one symbolic time and the phase-shift of π/4 are output from the third and fourth ports $P_{I3}$ and $P_{I4}$. Further, the signal light $S_{HQ}$ on the Q branch, which has been branched by the optical coupler $4_H$, passes through the optical circulator $10_{Q1}$ to be input to the first port $P_{Q1}$ of the delay interferometer $5_Q$, and is propagated through the delay interferometer $5_Q$ from the left hand to the right hand in FIG. 1, so that lights given to be interfered with the delay of one symbolic time and the phase-shift of −π/4 are output from the third and fourth ports $P_{Q3}$ and $P_{Q4}$. Then, the output lights from the third and fourth ports $P_{I3}$ and $P_{I4}$ of the delay interferometer $5_I$ are input to the balanced optical detector $6_{HI}$ to be subjected to the differential photoelectric conversion detection, and also, the output lights from the third and fourth ports $P_{Q3}$ and $P_{Q4}$ of the delay interferometer $5_Q$ are input to the balanced optical detector $6_{HQ}$ to be subjected to the differential photoelectric conversion detection.

On the other hand, the signal light $S_{VI}$ on the I branch, which has been branched by the optical coupler $4_V$, passes through the optical circulator $10_{I2}$ to be input to the third port $P_{I3}$ of the delay interferometer $5_I$, and is propagated through the delay interferometer $5_I$ from the right hand to the left hand in FIG. 1, so that lights given to be interfered with the delay of one symbolic time and the phase-shift of π/4 are output from the first and second ports $P_{I1}$ and $P_{I2}$. Further, the signal light $S_{VQ}$ on the Q branch, which has been branched by the optical coupler $4_V$, passes through the optical circulator $10_{Q2}$ to be input to the third port $P_{Q3}$ of the delay interferometer $5_Q$, and is propagated through the delay interferometer $5_Q$ from the right hand to the left hand in FIG. 1, so that lights given to be interfered with the delay of one symbolic time and the phase-shift of −π/4 are output from the first and second ports $P_{Q1}$ and $P_{Q2}$. Then, the output lights from the first and second ports $P_{I1}$ and $P_{I2}$ of the delay interferometer $5_I$ are input to the balanced optical detector $6_{VI}$ to be subjected to the differential photoelectric conversion detection, and also, the output lights from the first and second ports $P_{Q1}$ and $P_{Q2}$ of the delay interferometer $5_Q$ are input to the balanced optical detector $6_{VQ}$ to be subjected to the differential photoelectric conversion detection.

The current signal output from each of the balanced optical detectors $6_{HI}$ to $6_{VI}$ is converted into the voltage signal by each of the TIAs $71_{HI}$ to $71_{VI}$ of the reception circuit 7, and thereafter, is amplified by each of the LIAs $72_{HI}$ to $72_{VI}$ to be sent to each of the decision circuits $73_{HI}$ to $73_{VI}$. In each of the decision circuits $73_{HI}$ to $73_{VI}$, the logical judgment is performed on the output signal from each of the LIAs $72_{HI}$ to $72_{VI}$. The signals output from the decision circuits $73_{HI}$ and $73_{HQ}$ are multiplexed by the multiplexer $74_H$ so that the reception data $D_H$ obtained by demodulating the horizontally polarized DQPSK modulated signal light $S_H$ is regenerated, and also, the signals output from the decision circuits $73_{VQ}$ and $73_{VI}$ are multiplexed by the multiplexer $74_V$ so that the reception data $D_V$ obtained by demodulating the vertically polarized DQPSK modulated signal light $S_V$ is regenerated.

At the time, for the signals on the side corresponding to the horizontally polarized waves among the signals processed by the reception circuit 7, the output signal of the TIA $71_{HI}$ on the I branch side is multiplied by the output signal of the decision circuit $73_{HQ}$ on the Q branch side by the mixer $81_I$ in the control circuit 8, and the output signal of the mixer $81_I$ is sent to the microcontroller 82. Further, the output signal of the TIA $71_{HQ}$ on the Q branch side is multiplied by the output signal of the decision circuit $73_{HI}$ on the I branch by the mixer $81_Q$ in the control circuit 8, and the output signal of the mixer $81_Q$ is sent to the microcontroller 82. In the microcontroller 82, the predetermined operation processes are executed using the output signals from the mixers $81_I$ and $81_Q$ so that a phase error between the I branch and the Q branch is monitored, and the control signals $C_I$ and $C_Q$ for optimizing the phase-shifting amounts in the delay interferometers $5_I$ and $5_Q$ are generated so that the phase error becomes substantially zero. In accordance with the control signals $C_I$ and $C_Q$, the temperature regulating devices, such as the heater, the Peltier unit or the like, disposed on the substrate 5, are controlled, so that the phase-shifting amount of the delay interferometer $5_I$ is precisely set at "π/4" and the phase-shifting amount of the delay interferometer $5_Q$ is precisely set at "−π/4". Namely, a relative phase difference between the lights propagated through the delay interferometers $5_I$ and $5_Q$, is optimized to π/2.

Incidentally, specific contents of the feedback controls of the delay interferometers $5_I$ and $5_Q$ by the control circuit 8 are disclosed in detail in Japanese Laid-open Patent Publication No 2007-20138, and accordingly, the explanation thereof is omitted here.

As described above, according to the optical reception apparatus in the first embodiment, one substrate 5 on which a set of delay interferometers $5_I$ and $5_Q$ is formed is combined with four optical circulators $10_{I1}$ to $10_{Q2}$, so that the horizontally polarized signal light $S_H$ and the vertically polarized signal light $S_V$ are supplied in bidirectional to the delay interferometers $5_I$ and $5_Q$. Consequently, the configurations of the delay interferometers corresponding to the horizontally/vertically polarized waves can be made common, and it becomes possible to receive to process the DQPSK polarization multiplexed signal light by the delay interferometers of simple configuration basically similar to that of a delay interferometer for the case where the polarization multiplexing is not performed. Further, the delay interferometers are made common, so that the configuration for feedback controlling the optical phase difference between the delay interferometers is simplified. Therefore, an electric power required for the temperature regulation of the delay interferometers and an influence due to characteristic variations in circuit parts can be reduced. Thus, it becomes possible to provide a miniaturized optical reception apparatus of low power consumption and low cost.

Next, there will be described a second embodiment according to the present invention.

Figure 3:
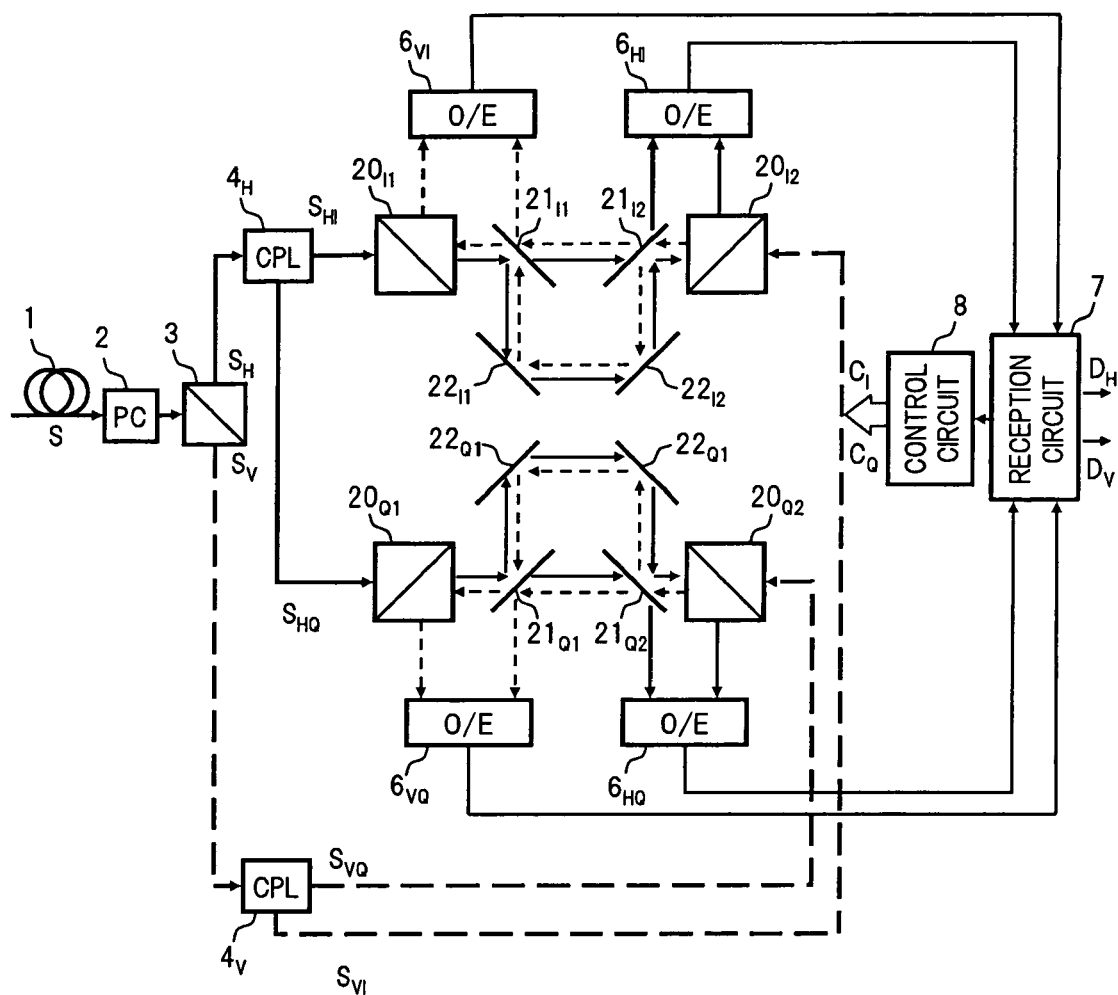
FIG. 3 is a block diagram showing a second embodiment of the optical reception apparatus compatible with the DQPSK polarization multiplexing format.

FIG. 3 is a block diagram showing the second embodiment of the optical reception apparatus corresponding to the DQPSK polarization multiplexing format according to the present invention.

In FIG. 3, a configuration of the second embodiment of the optical reception apparatus differs from that of the first embodiment in that the configuration equivalent to the delay interferometer $5_I$ and the optical circulators $10_{I1}$ and $10_{I2}$, which correspond to the I branch in the first embodiment, is configured by a spatial optical system obtained by combining polarization beam splitters $20_{I1}$ and $20_{I2}$, half mirrors $21_{I1}$ and $21_{I2}$ and total reflection mirrors $22_{I1}$ and $22_{I2}$, and also, the configuration equivalent to the delay interferometer $5_Q$ and the optical circulators $10_{Q1}$ and $10_{Q2}$, which correspond to the Q branch in the first embodiment, is configured by a spatial optical system obtained by combining polarization beam splitters $20_{Q1}$ and $20_{Q2}$, half mirrors $21_{Q1}$ and $21_{Q2}$ and total reflection mirrors $22_{Q1}$ and $22_{Q2}$, and further, with the application of these configurations, polarization-preserving type devices are used as the optical couplers $4_H$ and $4_V$. The configuration of the optical reception apparatus other than the above is similar to that in the first embodiment, and accordingly, the explanation thereof is omitted here.

The polarization beam splitter $20_{I1}$ is input with the horizontally polarized signal light $S_{HI}$ (solid line) branched by the optical coupler $4_H$ at an end face thereof positioned on the left side in FIG. 3, and also, is input with the vertically polarized signal light $S_{VI}$ (dotted line) output from the half mirror $21_{I1}$ at an end face thereof on the right side. The polarization beam splitter $20_{I1}$ has characteristics of linearly moving the horizontally polarized wave and of turning a propagation direction of the vertically polarized wave by approximately 90°, and accordingly, outputs to send the horizontally polarized signal light $S_{HI}$ input at the end face thereof on the left side, to the half mirror $21_{I1}$ from the end face thereof on the right side, and outputs to send the vertically polarized signal light $S_{VI}$ input at the end face thereof on the right side, to the balanced optical detector $6_{VI}$ from an end face thereof on the upper side.

The polarization beam splitter $20_{Q1}$ is input with the horizontally polarized signal light $S_{HQ}$ (solid line) branched by the optical coupler $4_H$ at an end face thereof positioned on the left side in FIG. 3, and also, is input with the vertically polarized signal light $S_{VQ}$ (dotted line) output from the half mirror $21_{Q1}$ at an end face thereof on the right side. The polarization beam splitter $20_{Q1}$ also has characteristics of linearly moving the horizontally polarized wave and of turning the propagation direction of the vertically polarized wave by approximately 90°, and accordingly, outputs to send the horizontally polarized signal light $S_{HQ}$ input at the end face thereof on the left side, to the half mirror $21_{Q1}$ from the end face thereof on the right side, and outputs to send the vertically polarized signal light $S_{VQ}$ input at the end face thereof on the right side, to the balanced optical detector $6_{VQ}$ from an end face thereof on the lower side.

The polarization beam splitter $20_{I2}$ is input with the vertically polarized signal light $S_{VI}$ (dotted line) branched by the optical coupler $4_V$ at an end face thereof positioned on the right side in FIG. 3, and also, is input with the horizontally polarized signal light $S_{HI}$ (solid line) output from the half mirror $21_{I2}$ at an end face thereof on the left side. The polarization beam splitter $20_{I2}$ has characteristics of linearly moving the vertically polarized wave and of turning a propagation direction of the horizontally polarized wave by approximately 90°, and accordingly, outputs to send the vertically polarized signal light $S_{VI}$ input at the end face thereof on the right side, to the half mirror $21_{I2}$ from the end face thereof on the left side, and outputs to send the horizontally polarized signal light $S_{HI}$ input at the end face thereof on the left side, to the balanced optical detector $6_{HI}$ from an end face thereof on the upper side.

The polarization beam splitter $20_{Q2}$ is input with the vertically polarized signal light $S_{VQ}$ (dotted line) branched by the optical coupler $4_V$ at an end face thereof positioned on the right side in FIG. 3, and also, is input with the horizontally polarized signal light $S_{HQ}$ (solid line) output from the half mirror $21_{Q2}$ at an end face thereof on the left side. The polarization beam splitter $20_{Q2}$ also has characteristics of linearly moving the vertically polarized wave and of turning the propagation direction of the horizontally polarized wave by approximately 90°, and accordingly, outputs to send the vertically polarized signal light $S_{VQ}$ input at the end face thereof on the right side, to the half mirror $21_{Q2}$ from the end face thereof on the left side, and outputs to send the horizontally polarized signal light $S_{HQ}$ input at the end face thereof on the left side, to the balanced optical detector $6_{HQ}$ from an end face thereof on the lower side.

The half mirror $21_{I1}$ is arranged to be inclined by 45° relative to the opposing end face of the polarization beam splitter $20_{I1}$, and reflects a part of the horizontally polarized signal light $S_{HI}$ output from the polarization beam splitter $20_{I1}$ to send it to the total reflection mirror $22_{I1}$, while sending the remaining transmitted light to the half mirror $21_{I2}$. Further, the half mirror $21_{I1}$ reflects a part of the vertically polarized signal light $S_{VI}$ which is transmitted over the half mirror $21_{I2}$ to be input to the half mirror $21_{I1}$, to send it to the balanced optical detector $6_{VI}$, while sending the remaining transmitted light to the polarization beam splitter $20_{I1}$. Furthermore, the half mirror $21_{I1}$ reflects a part of the vertically polarized signal light $S_{VI}$ which is reflected by the total reflection mirror $22_{I1}$ to be input to the half mirror $21_{I1}$, to send it to the polarization beam splitter $20_{I1}$, while sending the remaining transmitted light to the balanced optical detector $6_{VI}$.

The half mirror $21_{Q1}$ is arranged to be inclined by 45° relative to the opposing end face of the polarization beam splitter $20_{Q1}$, and reflects a part of the horizontally polarized signal light $S_{HQ}$ output from the polarization beam splitter $20_{Q1}$ to send it to the total reflection mirror $22_{Q1}$, while sending the remaining transmitted light to the half mirror $21_{Q2}$. Further, the half mirror $21_{Q1}$ reflects a part of the vertically polarized signal light $S_{VQ}$ which is transmitted over the half mirror $21_{Q2}$ to be input to the half mirror $21_{Q1}$, to send it to the balanced optical detector $6_{VQ}$, while sending the remaining transmitted light to the polarization beam splitter $20_{Q1}$. Furthermore, the half mirror $21_{Q1}$ reflects a part of the vertically polarized signal light $S_{VQ}$ which is reflected by the total reflection mirror $22_{Q1}$ to be input to the half mirror $21_{Q1}$, to send it to the polarization beam splitter $20_{Q1}$, while sending the remaining transmitted light to the balanced optical detector $6_{VQ}$.

The half mirror $21_{I2}$ is arranged to be inclined by 45° relative to the opposing end face of the polarization beam splitter $20_{I2}$, and reflects a part of the vertically polarized signal light $S_{VI}$ output from the polarization beam splitter $20_{I2}$ to send it to the total reflection mirror $22_{I2}$, while sending the remaining transmitted light to the half mirror $21_{I1}$. Further, the half mirror $21_{I2}$ reflects a part of the horizontally polarized signal light $S_{HI}$ which is transmitted over the half mirror $21_{I1}$ to be input to the half mirror $21_{I2}$, to send it to the balanced optical detector $6_{HI}$, while sending the remaining transmitted light to the polarization beam splitter $20_{I2}$. Furthermore, the half mirror $21_{I2}$ reflects a part of the horizontally polarized signal light $S_{HI}$ which is reflected by the total reflection mirror $22_{I2}$ to be input to the half mirror $21_{I2}$, to send it to the polarization beam splitter $20_{I2}$, while sending the remaining transmitted light to the balanced optical detector $6_{HI}$.

The half mirror $21_{Q2}$ is arranged to be inclined by 45° relative to the opposing end face of the polarization beam splitter $20_{Q2}$, and reflects a part of the vertically polarized signal light $S_{VQ}$ output from the polarization beam splitter $20_{Q2}$ to send it to the total reflection mirror $22_{Q2}$, while sending the remaining transmitted light to the half mirror $21_{Q1}$. Further, the half mirror $21_{Q2}$ reflects a part of the horizontally polarized signal light $S_{HQ}$ which is transmitted over the half mirror $21_{Q1}$ to be input to the half mirror $21_{Q2}$, to send it to the balanced optical detector $6_{HQ}$, while sending the remaining transmitted light to the polarization beam splitter $20_{Q2}$. Furthermore, the half mirror $21_{Q2}$ reflects a part of the horizontally polarized signal light $S_{HQ}$ which is reflected by the total reflection mirror $22_{Q2}$ to be input to the half mirror $21_{Q2}$, to send it to the polarization beam splitter $20_{Q2}$, while sending the remaining transmitted light to the balanced optical detector $6_{HQ}$.

The total reflection mirror $22_{I1}$ is arranged so that a reflecting surface thereof is in parallel with the half mirror $21_{I1}$ and a distance thereof to the half mirror $21_{I1}$ can be varied by a position regulating device (not shown in the figure), such as an actuator or the like. The total reflection mirror $22_{I2}$ is arranged so that a reflecting surface thereof is in parallel with the half mirror $21_{I2}$, and a distance thereof to the half mirror $21_{I2}$ can be varied by a position regulating device (not shown in the figure), such as an actuator or the like. Further, the total reflection mirror $22_{Q1}$ is arranged so that a reflecting surface thereof is in parallel with the half mirror $21_{Q1}$ and a distance thereof to the half mirror $21_{Q1}$ can be varied by a position regulating device (not shown in the figure), such as an actuator or the like. The total reflection mirror $22_{Q2}$ is arranged so that a reflecting surface thereof is in parallel with the half mirror $21_{Q2}$, and a distance thereof to the half mirror $21_{Q2}$ can be varied by a position regulating device (not shown in the figure), such as an actuator or the like. The above described position regulating devices each has a function equivalent to the temperature regulating device for the delay interferometer in the first embodiment, and operations of the actuators or the like are controlled in accordance with the control signals $C_I$ and $C_Q$ output from the control circuit 8.

In the optical reception apparatus of the above configuration, for the I branch, the delay of one symbolic time and the phase-shift of π/4 are given according to a difference between the optical path length from the half mirror $21_{I1}$ to the half mirror $21_{I2}$, and the optical path length from the half mirror $21_{I1}$ via the total reflection mirror $22_{I1}$ and the total reflection mirror $22_{I2}$ to the half mirror $22_{I2}$. Further, for the Q branch, the delay of one symbolic time and the phase-shift of −π/4 are given according to a difference between the optical path length from the half mirror $21_{Q1}$ to the half mirror $21_{Q2}$, and the optical path length from the half mirror $21_{Q1}$ via the total reflection mirror $22_{Q1}$ and the total reflection mirror $22_{Q2}$ to the half mirror $22_{Q2}$. Even in the case where a set of delay interferometers configured by such half mirrors and the total reflection mirrors is combined with four polarization beam splitters $20_{I1}$ to $20_{Q2}$ so that the horizontally polarized signal light $S_H$ and the vertically polarized signal light $S_V$ are supplied in bidirectional, it is possible to obtain a functional effect similar to that in the first embodiment. Further, by using the polarization beam splitters in place of the optical circulators, it becomes possible to further miniaturize the optical reception apparatus.

Figure 4:
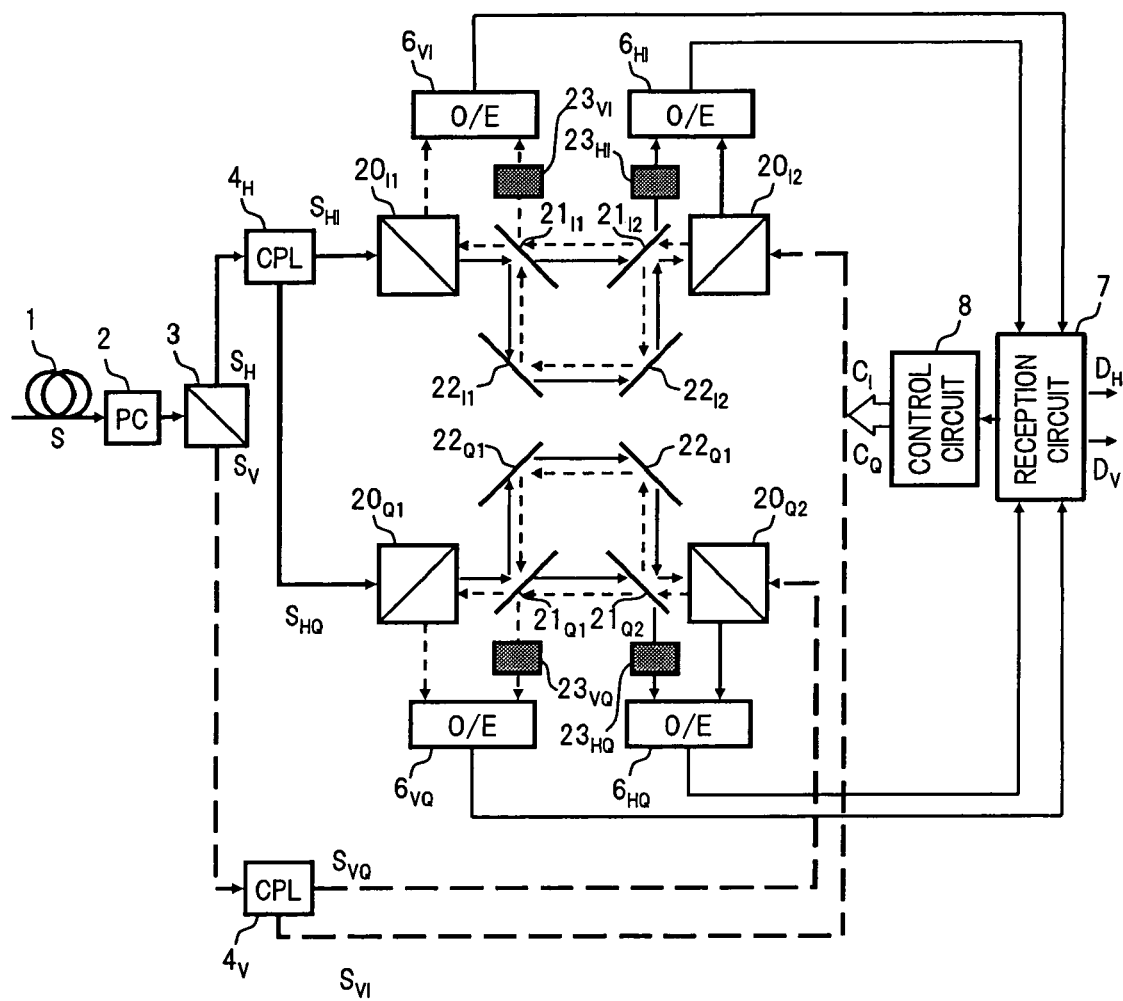
FIG. 4 is a diagram showing a configuration of an application example relating to the second embodiment.

Incidentally, in the configuration of the second embodiment, there may be a possibility that, when the signal lights passed through the delay interferometers are received by the respective balanced optical detectors, the optical path length of the light which is directly input to the balanced optical detector from the half mirror is different from the optical path length of the light which passes from the half mirror through the polarization beam splitter to be input to the balanced optical detector, and accordingly, such an optical path length difference causes a problem. In order to avoid such a problem in the optical path length difference, as shown in FIG. 4 for example, birefringent plates $23_{HI}$, $23_{HQ}$, $23_{VQ}$ and $23_{VI}$ for the balanced optical detectors $6_{HI}$, $6_{HQ}$, $6_{VQ}$ and $6_{VI}$ each is inserted on an optical path for one of the two input lights, to equalize the optical path lengths of the two input lights. Although one example of using the birefringent plates is shown here, it is surely possible to use known devices having functions equivalent to the birefringent plates as optical path length adjusting sections.

Next, there will be described a third embodiment according to the present invention.

In the configurations of the first and second embodiments described above, the DQPSK polarization multiplexed signal light transmitted over the transmission path 1 is split into the horizontally polarized signal light $S_H$ and the vertically polarized signal light $S_V$ before being supplied to the delay interferometers. Contrary to this, in the third embodiment, there will be described a configuration example in which the DQPSK polarization multiplexed signal light is supplied to the delay interferometers without being polarization split, and thereafter, the signal lights output from the respective delay interferometers corresponding to the I branch and the Q branch are split into the horizontally polarized waves and the vertically polarized waves, to be subjected to the reception process.

Figure 5:
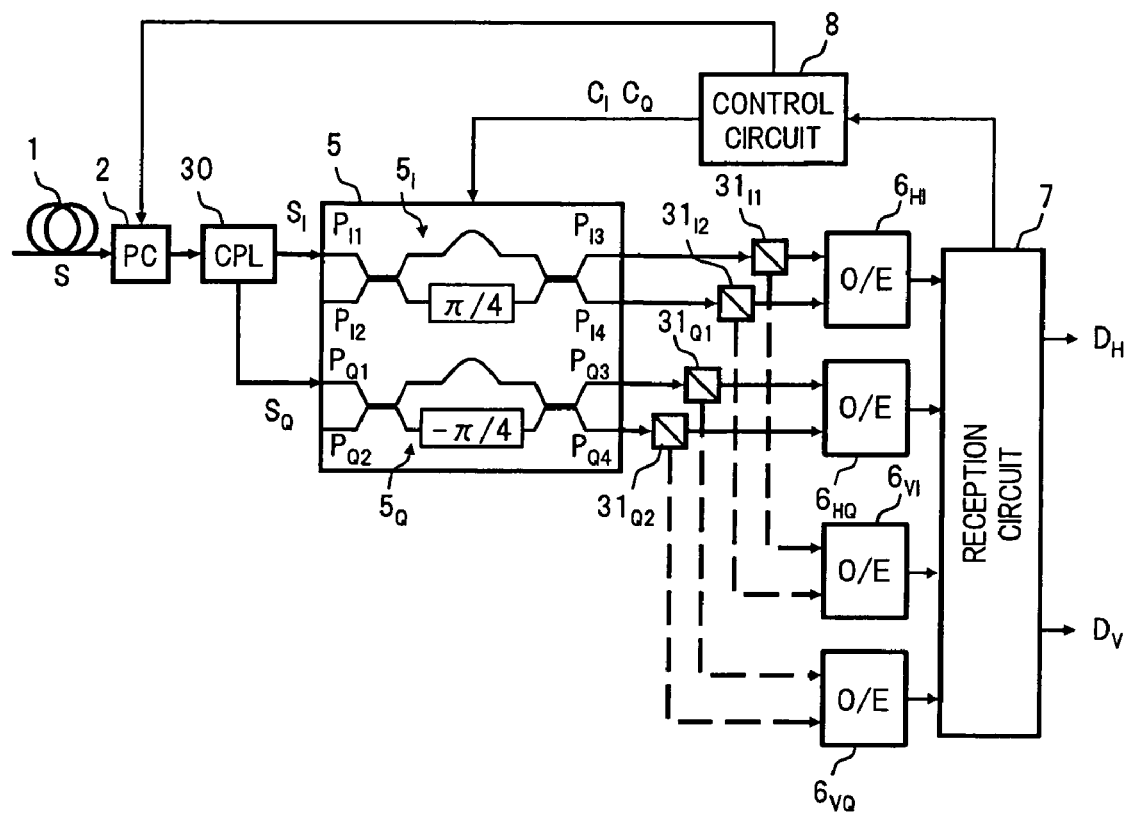
FIG. 5 is a block diagram showing a third embodiment of the optical reception apparatus compatible with the DQPSK polarization multiplexing format.
Figure 6:
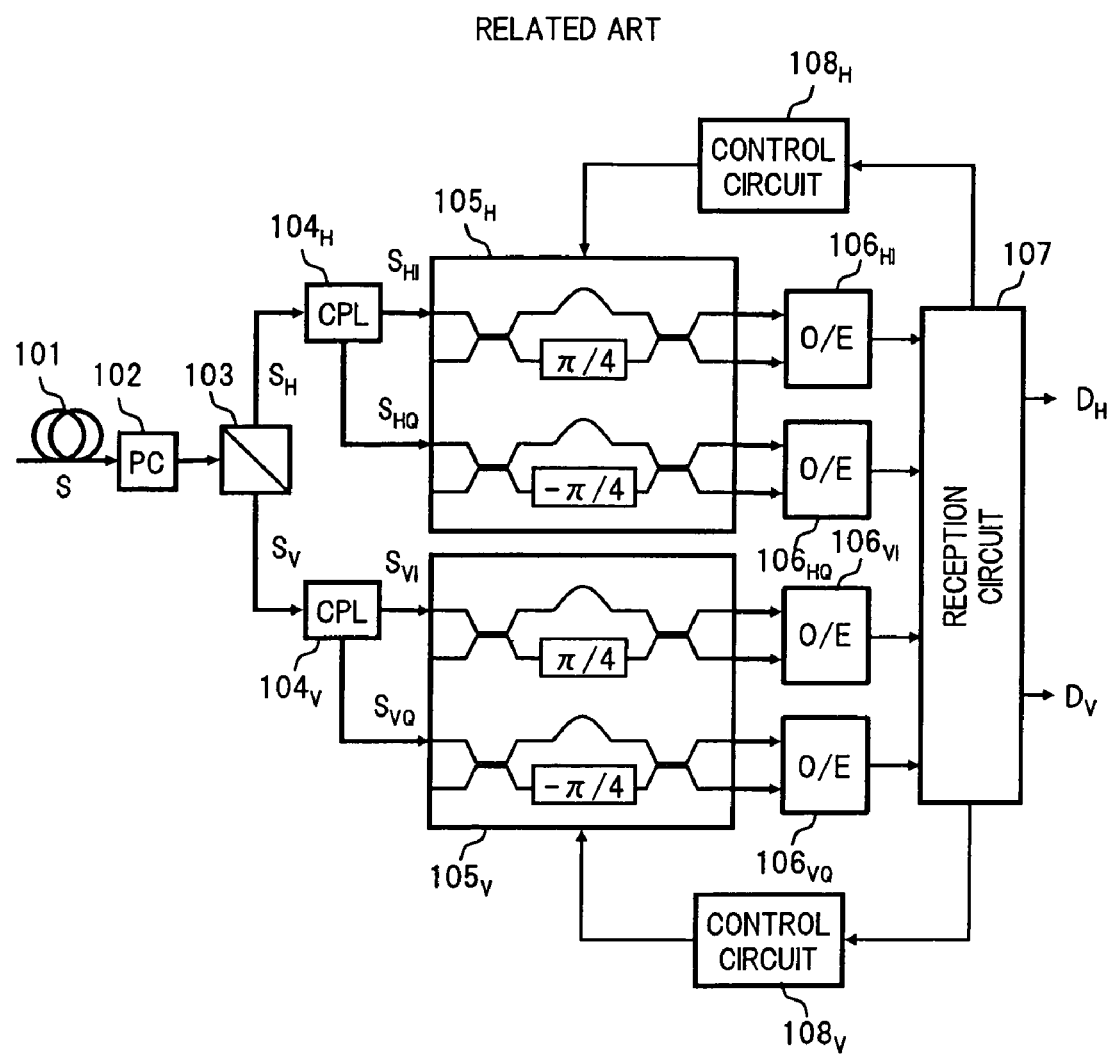
FIG. 6 is a diagram showing a typical configuration example of an optical reception apparatus compatible with the DQPSK polarization multiplexing format.

FIG. 5 is a diagram showing a configuration of the third embodiment of the optical reception apparatus.

In the optical reception apparatus shown in FIG. 5, the DQPSK polarization multiplexed signal light transmitted over the transmission path 1 is input to an optical coupler (CPL) 30 serving as a branching section via the polarization controller 2. In the optical coupler 30, the input light is branched into two at a power ratio of 1:1, so that first and second DQPSK modulated signal lights $S_I$ and $S_Q$ are output to the substrate 5. The DQPSK modulated signal light $S_I$ from the optical coupler 30 is input to the first port $P_{I1}$ of the delay interferometer $5_I$ on the I branch side to be propagated through the delay interferometer $5_I$, so that the lights given to be interfered with the delay of one symbolic time and the phase-shift of $\pi/4$ are output from the third port $P_{I3}$ and the fourth port $P_{I4}$. Similarly, the DQPSK modulated signal light $S_Q$ from the optical coupler 30 is input to the first port $P_{Q1}$ of the delay interferometer $5_Q$ on the Q branch side to be propagated through the delay interferometer $5_Q$, so that the lights given to be interfered with the delay of one symbolic time and the phase-shift of $-\pi/4$ are output from the third port $P_{Q3}$ and the fourth port $P_{Q4}$.

The output lights from the third and fourth ports $P_{I3}$ and $P_{I4}$ of the delay interferometer $5_I$ and the output lights from the third and fourth ports $P_{Q3}$ and $P_{Q4}$ of the delay interferometer $5_Q$ are respectively input to polarization beam splitters $31_{I1}$, $31_{I2}$, $31_{Q1}$ and $31_{Q2}$ of which polarization axes are aligned in the same direction, to be split into horizontally polarized signal lights and vertically polarized signal lights. Then, the horizontally polarized signal lights output from the polarization beam splitters $31_{I1}$ and $31_{I2}$ are input to the balanced optical detector $6_{HI}$, and the horizontally polarized signal lights output from the polarization beam splitters $31_{Q1}$ and $31_{Q2}$ are input to the balanced optical detector $6_{HQ}$. Further, the vertically polarized signal lights output from the polarization beam splitters $31_{I1}$ and $31_{I2}$ are input to the balanced optical detector $6_{VI}$, and the vertically polarized signal lights output from the polarization beam splitters $31_{Q1}$ and $31_{Q2}$ are input to the balanced optical detector $6_{VQ}$.

The current signals output from the balanced optical detectors $6_{HI}$ to $6_{VQ}$ are respectively input to the reception circuit 7 in which a signal process similar to that in the first embodiment is executed, so that the reception data $D_H$ corresponding to the horizontally polarized waves and the reception data $D_V$ corresponding to the vertically polarized waves are regenerated, and also, a predetermined operation process is executed in the control circuit 8 using a required signal processed in the reception circuit 7 so that the phase error between the I branch and the Q branch is monitored and according to the monitor result, the delay interferometers $5_I$ and $5_Q$ are feedback controlled. Further, simultaneously with the feedback control of the delay interferometers $5_I$ and $5_Q$, the polarization controller 2 on the input stage is feedback controlled and the optimization of polarization states of the signal lights supplied to the delay interferometers $5_I$ and $5_Q$ via the optical coupler 30 is achieved, so that reception signal levels respectively corresponding to the horizontally polarized waves and the vertically polarized waves become maximum.

According to the optical reception apparatus in the third embodiment as described above, even in the case where the DQPSK polarization multiplexed signal light S from the transmission path 1 is supplied to the first ports $P_{I1}$ and $P_{Q1}$ of the delay interferometers $5_I$ and $5_Q$ on the substrate 5 without being polarization split, and the output lights from the third ports $P_{I3}$ and $P_{Q3}$ and the fourth ports $P_{I4}$ and $P_{Q4}$ of the delay interferometers $5_I$ and $5_Q$ are split into the horizontally polarized waves and the vertically polarized waves by the polarization beam splitters $31_{I1}$; $31_{I2}$, $31_{Q1}$ and $31_{Q2}$, to be subjected to the reception process, it is possible to receive to process the DQPSK polarization multiplexed signal light S using only one substrate 5 on which is formed a set of delay interferometers $5_I$ and $5_Q$ corresponding to the I branch and the Q branch, and therefore, a functional operation effect similar to that in the first embodiment can be obtained.

In the third embodiment, the configuration example has been shown in which the four polarization beam splitters $31_{I1}$, $31_{I2}$, $31_{Q1}$ and $31_{Q2}$ are arranged so as to correspond to the third and fourth ports of the delay interferometers $5_I$ and $5_Q$. However, the configuration may be such that the polarization beam splitters $31_{I1}$ and $31_{I2}$ corresponding to the delay interferometer $5_I$ are integrated with each other, and also, the polarization beam splitters $31_{Q1}$ and $31_{Q2}$ corresponding to the delay interferometers $5_Q$ are integrated with each other, or the polarization beam splitters $31_{I1}$, $31_{I2}$, $31_{Q1}$ and $31_{Q2}$ are all integrated. As a result, it is possible to further miniaturize the optical reception apparatus.

What is claimed is:

1. An optical reception apparatus compatible with DQPSK polarization multiplexing format, for receiving to process a DQPSK polarization multiplexed signal light obtained by polarization multiplexing a set of DQPSK modulated signal lights of which polarization states are different from each other, comprising:

a polarization splitting section that splits the DQPSK polarization multiplexed signal light input thereto into a horizontally polarized DQPSK modulated signal light and a vertically polarized DQPSK modulated signal light;

a first branching section that branches the horizontally polarized DQPSK modulated signal light split by the polarization splitting section into two, to generate a first horizontally polarized signal light and a second horizontally polarized signal light;

a second branching section that branches the vertically polarized DQPSK modulated signal light split by the polarized splitting section into two, to generate a first vertically polarized signal light and a second vertically polarized signal light;

a first branch through which the first horizontally polarized signal light and the first vertically polarized signal light are propagated;

a second branch through which the second horizontally polarized signal light and the second vertically polarized signal light are propagated;

a first delay interfering section arranged on the first branch;

a second delay interfering section arranged on the second branch;

a signal light input/output section that supplies to the first delay interfering section the first horizontally polarized signal light and the first vertically polarized signal light so that propagation directions thereof are opposite to each other, and supplies to the second delay interfering section the second horizontally polarized signal light and the second vertically polarized signal light so that propagation directions thereof are opposite to each other, and also, extracts the first horizontally polarized signal light and the first vertically polarized signal light which have been propagated through the first delay interfering section, and extracts the second horizontally polarized signal light and the second vertically polarized signal light which have been propagated through the second delay interfering section;

first to fourth photoelectric converting sections that receive, respectively, the first horizontally polarized signal light, the first vertically polarized signal light, the second horizontally polarized signal light and the second vertically polarized signal light, which have been extracted by the signal light input/output section, to convert them into electric signals;

a reception processing section that processes the electric signals output from the first to fourth photoelectric converting sections, to regenerate reception data obtained by demodulating the horizontally polarized DQPSK modulated signal light and reception data obtained by demodulating the vertically polarized DQPSK modulated signal light; and a control section that feedback controls the first and second delay interfering sections based on the process result in the reception processing section.

2. An optical reception apparatus compatible with DQPSK polarization multiplexing format according to claim 1, wherein the first and second delay interfering sections each is configured using a Mach-Zehnder waveguide type delay interferometer which has first to fourth ports and includes an optical delay element on one of arms thereof and a phase-shifting element on the other arm, the signal light input/output section comprises: a first optical circulator which supplies the first horizontally polarized signal light to the first port of the first delay interfering section, and also, extracts the first vertically polarized signal light propagated through the first delay interfering section to be output from the first port; a second optical circulator which supplies the second horizontally polarized signal light to the first port of the second delay interfering section, and also, extracts the second vertically polarized signal light propagated through the second delay interfering section to be output from the first port; a third optical circulator which supplies the first vertically polarized signal light to the third port of the first delay interfering section, and also, extracts the first horizontally polarized signal light propagated through the first delay interfering section to be output from the third port; and a fourth optical circulator which supplies the second vertically polarized signal light to the third port of the second delay interfering section, and also, extracts the second horizontally polarized signal light propagated through the second delay interfering section to be output from the third port, the first photoelectric converting section receives the first horizontally polarized signal lights output from the third optical circulator and the fourth port of the second delay interfering section, the second photoelectric converting section receives the first vertically polarized signal lights output from the first optical circulator and the second port of the first delay interfering section, the third photoelectric converting section receives the second horizontally polarized signal lights output from the fourth optical circulator and the fourth port of the second delay interfering section, and the fourth photoelectric converting section receives the second vertically polarized signal lights output from the second optical circulator and the second port of the second delay interfering section.

3. An optical reception apparatus compatible with DQPSK polarization multiplexing format according to claim 2, wherein the control section regulates the temperature of each phase-shifting element in the first and second delay interfering sections, so that an optical phase difference between the signal light propagated through the first delay interfering section and the signal light propagated through the second delay interfering section reaches $\pi/2$.

4. An optical reception apparatus compatible with DQPSK polarization multiplexing format according to claim 1, wherein the first and second delay interfering sections each is configured using a delay interferometer made up by combining first and second half mirrors arranged symmetrically at a predetermined space with first and second total reflection mirrors arranged so that a reflecting surface of the first total reflection mirror is in parallel with the first half mirror and a reflecting surface of the second total reflection mirror is in parallel with the first half mirror, the signal light input/output section comprises:

a first polarization beam splitter which supplies the first horizontally polarized signal light to the first half mirror of the first delay interfering section, and also, extracts one of the first vertically polarized signal lights propagated through the delay interfering section to be output in bidirectional from the first half mirror;

a second polarization beam splitter which supplies the second horizontally polarized signal light to the first half mirror of the second delay interfering section, and also, extracts one of the second vertically polarized signal lights propagated through the second delay interfering section to be output in bidirectional from the first half mirror;

a third polarization beam splitter which supplies the first vertically polarized signal light to the second half mirror of the first delay interfering section, and also, extracts one of the first horizontally polarized signal lights propagated through the first delay interfering section to be output in bidirectional from the second half mirror; and a fourth polarization beam splitter which supplies the second vertically polarized signal light to the second half mirror of the second delay interfering section, and also extracts one of the second horizontally polarized signal lights propagated through the second delay interfering section to be output in bidirectional from the second half mirror, the first photoelectric converting section receives the first horizontally polarized signal light output from the third polarization beam splitter and the other of the first horizontally polarized signal lights output in bidirectional from the second half mirror of the first delay interfering section, the second photoelectric converting section receives the first vertically polarized signal light output from the first polarization beam splitter and the other of the first vertically polarized signal lights output in bidirectional from the first half mirror of the first delay interfering section, the third photoelectric converting section receives the second horizontally polarized signal light output from the fourth polarization beam splitter and the other of the second horizontally polarized signal lights output in bidirectional from the second half mirror of the second delay interfering section, and the fourth photoelectric converting section receives the second vertically polarized signal light output from the second polarization beam splitter and the other of the second vertically polarized signal lights output in bidirectional from the first half mirror of the second delay interfering section.

5. An optical reception apparatus compatible with DQPSK polarization multiplexing format according to claim 4, wherein the control section adjusts the optical path length between the opposing half mirror and total reflection mirror in each of the first and second delay interfering sections, so that an optical phase difference between the signal light propagated through the first delay interfering section and the signal light propagated through the second delay interfering section reaches $\pi/2$.

6. An optical reception apparatus compatible with DQPSK polarization multiplexing format according to claim 4, wherein there are provided first to fourth optical path length adjusting sections for equalizing the optical path lengths of the two signal lights received by each of the first to fourth photoelectric converting sections.

7. An optical reception apparatus compatible with DQPSK polarization multiplexing format according to claim 6, wherein the first to fourth optical path length adjusting sections each is configured using a birefringent plate.

8. An optical reception apparatus compatible with DQPSK polarization multiplexing format, for receiving to process a DQPSK polarization multiplexed signal light obtained by polarization multiplexing a set of DQPSK modulated signal lights of which polarization states are different from each other, comprising:

a polarization controller which controls a polarization state of the DQPSK polarization multiplexed signal light input thereto;

a branching section that branches the DQPSK polarization multiplexed signal light output from the polarization controller into two, to generate a first DQPSK polarization multiplexed signal light and a second DQPSK polarization multiplexed signal light;

a first delay interfering section that is supplied with the first DQPSK polarization multiplexed signal light at an input port thereof;

a second delay interfering section that is supplied with the second DQPSK polarization multiplexed signal light at an input port thereof;

a first polarization beam splitter which is connected to one of two output ports of the first delay interfering section;

a second polarization beam splitter which is connected to the other of the two output ports of the first delay interfering section, and has a polarization axis in the same direction as that of the first polarization beam splitter;

a third polarization beam splitter which is connected to one of two output ports of the second delay interfering section, and has a polarization axis in the same direction as that of the first polarization beam splitter;

a fourth polarization beam splitter which is connected to the other of the two output ports of the second delay interfering section, and has a polarization axis in the same direction as that of the first polarization beam splitter;

a first photoelectric converting section that receives horizontally polarized signal lights output from the first and second polarization beam splitters to convert them into electric signals;

a second photoelectric converting section that receives horizontally polarized signal lights output from the third and fourth polarization beam splitters to convert them into electric signals;

a third photoelectric converting section that receives vertically polarized signal lights output from the first and second polarization beam splitters to convert them into electric signals;

a fourth photoelectric converting section that receives vertically polarized signal lights output from the third and fourth polarization beam splitters to convert them into electric signals;

a reception processing section that processes the electric signals output from the first to fourth photoelectric converting sections, to regenerate reception data obtained by demodulating the horizontally polarized DQPSK modulated signal light and reception data obtained by demodulating the vertically polarized DQPSK modulated signal light; and a control section that feedback controls the first and second delay interfering section and the polarization controller, based on the process result in the reception processing section.

9. An optical reception apparatus compatible with DQPSK polarization multiplexing format according to claim 8, wherein the first and second delay interfering sections each is configured using a Mach-Zehnder optical waveguide type delay interferometer including an optical delay element on one of arms thereof and a phase-shifting element on the other arm thereof, and the control section regulates the temperature of each phase-shifting element in the first and second delay interfering sections, so that an optical phase difference between the signal light propagated through the first delay interfering section and the signal light propagated through the second delay interfering section reaches $\pi/2$.

10. An optical reception apparatus compatible with DQPSK polarization multiplexing format according to claim 8,
  wherein the control section controls the polarization controller so that reception signal levels respectively corresponding to horizontally polarized waves and vertically polarized waves become maximum together.

11. An optical reception apparatus compatible with DQPSK polarization multiplexing format according to claim 8,
  wherein at least two of the first to fourth polarization beam splitters are integrated with each other.

12. An optical reception apparatus compatible with DQPSK polarization multiplexing format according to claim 11,
  wherein the first to fourth polarization beam splitters are all integrated.

* * * * *